United States Patent Office 2,807,619
Patented Sept. 24, 1957

2,807,619
2-AMINOALKANOLPYRIDINES

Francis E. Cislak, Indianapolis, Ind., assignor to Reilly Tar & Chemical Corporation, Indianapolis, Ind., a corporation of Indiana No Drawing. Application July 23, 1956,
Serial No. 599,322

12 Claims. (Cl. 260—296)

This invention relates to new chemical compounds and to the process of making them. More particularly, it relates to 2-aminoalkanolpyridines having the general formula:

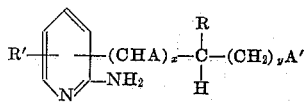

where $x$ and $y$ are 0, 1, or 2 and they may be alike or different, A and A' are either hydrogen or hydroxyl, R is hydrogen or lower alkyl, and R' is hydrogen, lower alkyl, hydroxy-lower alkyl, benzyl or benzhydryl.

In general the compounds of my invention may be prepared by reacting an alkanolpyridine with sodamide. The equation below portrays the preparation of 2-amino-4-(1-propan-3-ol)pyridine:

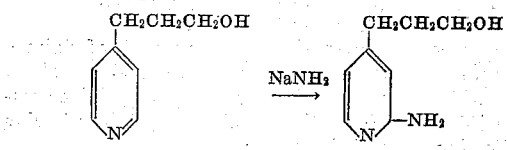

My invention will be described more fully in conjunction with the following specific examples. It should be understood, however, that these examples are given by way of illustration only and that my invention is not to be limited by the details set forth therein.

EXAMPLE 1
2-amino-4-(1-propan-3-ol)pyridine

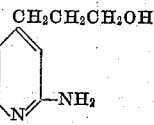

About 90 grams of finely divided sodamide is dispersed in about 500 cc. of anhydrous xylene. The mixture of sodamide and xylene is heated to about 100–120° C. During the heating up and during the subsequent reaction period the sodamide-xylene mixture is continually stirred. To the hot dispersion of sodamide in xylene there is added in small portions, 137 grams of 4-(1-propan-3-ol)pyridine. Hydrogen is evolved by the amination reaction. At first the rate of hydrogen evolution is quite rapid. When the hydrogen evolution begins slowing down, the temperature of the reaction mixture is raised to about 130–140° C. and is maintained at this temperature for about three to four hours after all of the propanolpyridine has been added. When the reaction is completed, about 200 cc. of the xylene is removed by vacuum distillation. To the residue there is added first about 50 cc. of methanol and then about 100 cc. of water. The 2-amino-4-(1-propan-3-ol)pyridine formed is isolated in any suitable manner. One way of isolating the 2-amino-4-(1-propan-3-ol)pyridine is as follows: To the mixture above there is added 200–300 cc. of 4-picoline and the mixture is thoroughly agitated. Upon settling, two layers are formed, an aqueous caustic soda layer and the 4-picoline layer containing the 2-amino-4-(1-propan-3-ol)pyridine. The 4-picoline layer is separated. Some of the aqueous caustic layer is dissolved in the 4-picoline layer; this is neutralized by treatment with carbon dioxide. The 2-amino-4-(1-propan-3-ol)pyridine is separated by fractional distillation under vacuum.

In place of the sodamide I may use other alkali amides, such, for example, as potassium amide.

In place of xylene as the reaction medium, I may use various other hydrocarbons, such as toluene, cumene, and the like, or I may use dimethylaniline.

In general it is desirable to carry out the reaction at the lowest possible temperature. I find that a temperature above about 100° C. is desirable.

I prefer to use at least two mols of sodamide per mol of alkanolypyridine. The use of a smaller ratio of sodamide results in a lower yield.

EXAMPLE 2
2-amino-6-(1-propan-3-ol)pyridine

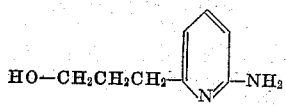

The procedure of Example 1 is repeated with the exception that 2-(1-propan-3-ol)pyridine is used instead of the 4-(1-propan-3-ol)pyridine.

EXAMPLE 3
3-(2-aminopyridyl)carbinol

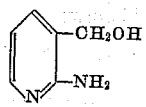

The procedure of Example 1 is repeated with the exception that 3-pyridylcarbinol is used in place of the 4-(1-propan-3-ol)pyridine. I believe that in addition to the 2-amino-3-methanolpyridine, some 2-amino-5-methanolpyridine is formed.

EXAMPLE 4
2-amino-3-ethyl-6-(1-ethan-2-ol)pyridine

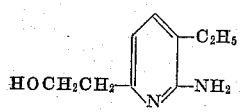

The procedure of Example 1 is repeated with the exception that 3-ethyl-6-(1-ethan-2-ol)pyridine is used in place of the 4-(1-propan-3-ol)pyridine.

EXAMPLE 5
2-amino-6-(1-ethan-2-ol)pyridine

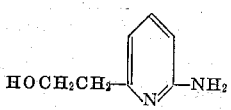

The procedure of Example 1 is repeated with the exception that 2-(1-ethan-2-ol)pyridine is used in place of the 4-(1-propan-3-ol)pyridine.

EXAMPLE 6
2-amino-4-(1-propan-3-ol)-6-(1-ethan-2-ol)pyridine

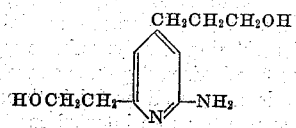

The procedure of Example 1 is repeated with the exception that 2-(1-ethan-2-ol)-4-(1-propan-3-ol)pyridine is used in place of the 4-(1-propan-3-ol)pyridine and 110 grams of sodamide are used in place of the 90 grams used in Example 1.

EXAMPLE 7

*2-amino-4-(3-pentan-1:5-diol)pyridine*

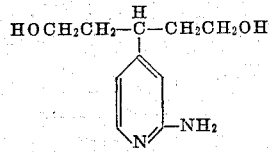

The procedure of Example 1 is repeated with the exception that 4-(3-pentan-1:5-diol)pyridine is used in place of the 4-(1-propan-3-ol)pyridine and 110 grams of sodamide are used in place of the 90 grams used in Example 1.

EXAMPLE 8

*6-(2-aminopyridyl)carbinol*

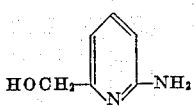

The procedure of Example 1 is repeated with the exception that 2-pyridylcarbinol is used in place of the 4-(1-propan-3-ol)pyridine.

The 2-aminoalkanolpyridines of my invention are useful as intermediates in the preparation of pharmaceuticals, insecticides, fungicides, and industrial organic chemicals. Thus, 2-amino-4-(1-propan-3-ol)pyridine may be used in the preparation of the pharmacologically active 2-mercapto-4-(1-propan-3-ol)pyridine-N-oxide in accordance with the reactions portrayed below:

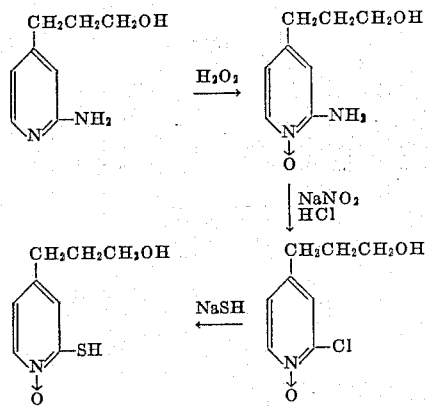

My 2-amino-6-(1-ethan-2-ol)pyridine may be used to make 2-amino-6-vinylpyridine.

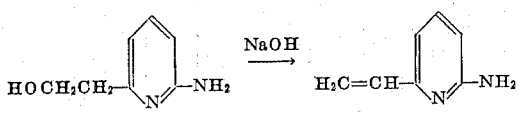

The 2-aminoalkanolpyridines of my invention are amino-alcohols. They have chemical properties associated with amino-alcohols and are capable of entering into the same type of reactions as other amino-alcohols, within the limitations imposed by the pyridine nucleus. The 2-aminoalkanolpyridine soaps, such as the stearate, may be used as emulsion stabilizers.

Some of my 2-aminoalkanolypyridines, such, for example, as the 2-amino-4-(3-pentan-1:5-diol) pyridine are useful in the formulation of polyurethane type resins. The presence of the two hydroxyl groups as well as the amino group makes this compound useful both as a component of the polyester as well as an internal catalyst.

Some of the 2-aminopyridylcarbinols claimed in this application may also be made by the process described and claimed in my co-pending application Serial No. 599,323 filed even date herewith.

In said co-pending application I describe and claim the preparation of 4-(2-aminopyridyl) carbinols and 6-(2-aminopyridyl) carbinols by a process comprising refluxing with acetic anhydride a 2-acetamido-4-alkylpyridine-N-oxide or a 2-acetamido-6-alkylpyridine-N-oxide. Also claimed in said co-pending application are phenyl and diphenyl 4-(2-aminopyridyl) carbinols and 6-(2-aminopyridyl) carbinols.

I claim as my invention:

1. A compound of the class consisting of 2-aminoalkanolpyridines having the following general formulae:

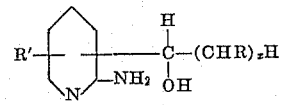

and

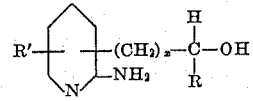

where $x$ is an integer selected from the group consisting of 0, 1, and 2, R is one of the group consisting of hydrogen and lower alkyl, and R' is one of the group consisting of lower alkyl, hydrogen, hydroxy-lower alkyl, and benzyl.

2. 2-amino-4-(1-propan-3-ol)pyridine.
3. 2-amino-6-(1-propan-3-ol)pyridine.
4. 2-amino-3-ethyl-6-(1-ethan-2-ol)pyridine.
5. 2-amino-3-ethyl-6-(1-propan-3-ol)pyridine.
6. 2-amino-6-(1-ethan-2-ol)pyridine.
7. The process of preparing the compounds of claim 1 which comprises heating at a temperature above about 100° C., with about two mols of sodamide a pyridine compound of the class consisting of alkanolpyridines having the following general formulae:

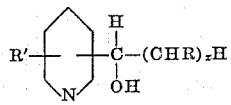

and

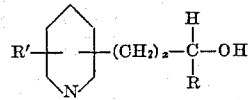

where $x$ is an integer selected from the group consisting of 0, 1, and 2, R is one of the group consisting of hydrogen and lower alkyl, and R' is one of the group consisting of lower alkyl, hydrogen, hydroxy-alkyl, and benzyl.

8. The process of claim 7 wherein the alkanolpyridine used is 4-(1-propan-3-ol)pyridine.
9. The process of claim 7 wherein the alkanolpyridine used is 6-(1-propan-3-ol)pyridine.
10. The process of claim 7 wherein the alkanolpyridine used is 3-ethyl-6-(1-ethan-2-ol)pyridine.
11. The process of claim 7 wherein the alkanolpyridine used is 3-ethyl-6-(1-propan-3-ol)pyridine.
12. The process of claim 7 wherein the alkanolpyridine used is 6-(1-ethan-2-ol)pyridine.

References Cited in the file of this patent

FOREIGN PATENTS

| | | |
|---|---|---|
| 358,397 | Germany | Sept. 11, 1922 |
| 362,446 | Germany | Oct. 27, 1922 |
| 476,458 | Germany | May 18, 1929 |

OTHER REFERENCES

Berezovskii: Chem. Abstracts, vol. 46, col. 3282 (1952).